United States Patent [19]

Roberts et al.

[11] 4,129,702

[45] Dec. 12, 1978

[54] POLYMERIZING UNSATURATED HALIDES WITH CARBAMATE TYPE METALLIC CATALYST

[75] Inventors: Philip D. Roberts; Geoffrey L. P. Randall; David G. Simon; Jeffrey Booth, all of Runcorn, England

[73] Assignee: Imperial Chemical Industries Limited, London, England

[21] Appl. No.: 489,716

[22] Filed: Jul. 18, 1974

[30] Foreign Application Priority Data

Aug. 19, 1973 [GB] United Kingdom ............... 34468/73

[51] Int. Cl.² .............................. C08F 2/34; C08F 4/64
[52] U.S. Cl. .................. 526/71; 252/431 N; 526/141; 526/343; 526/344.1; 526/901; 526/904
[58] Field of Search .................. 526/141, 71

[56] References Cited

U.S. PATENT DOCUMENTS

| 3,147,240 | 9/1964 | Coover, Jr. | 260/93.7 |
| 3,150,122 | 9/1964 | Andersen | 260/94.9 |
| 3,159,607 | 12/1964 | D'Alelio | 260/82.1 |
| 3,318,858 | 5/1967 | Nakaguchi | 260/93.7 |

FOREIGN PATENT DOCUMENTS 799823   8/1958   United Kingdom ................ 450/674.5

*Primary Examiner*—C. A. Henderson
*Attorney, Agent, or Firm*—Cushman, Darby & Cushman

[57] ABSTRACT

A process for the polymerization of vinyl halides and/or vinylidene halides which comprising contacting the vinyl halide and/or vinylidene halide in gaseous form with a catalyst composition comprising
(a) at least one compound of a transition metal of Groups IVA to VIA of the Periodic Table of the Elements, as hereinbefore defined, and
(b) at least one compound having the structure

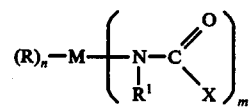

where M is aluminum or zinc, n and m each is an integer not greater than one less than the valency of M, at least one of the groups R is a hydrocarbon group, R¹ is hydrogen or a hydrocarbon group, and X is hydrogen or a monovalent organic group.

25 Claims, No Drawings

POLYMERIZING UNSATURATED HALIDES WITH CARBAMATE TYPE METALLIC CATALYST

This invention relates to a process for the polymerisation of vinyl halides and/or vinylidene halides and to catalyst compositions suitable for the polymerisation of vinyl halides and/or vinylidene halides.

It is known to polymerise α-olefins using as catalyst a so-called Ziegler catalyst comprising a mixture of a transition metal compound and an alkyl aluminium compound, for example, an alkyl aluminium or an alkyl aluminium halide. Such catalysts are, however, less suitable for use in the polymerisation of polar monomers such as vinyl halides and vinylidene halides in that in general only very low yields of polymer are obtained.

It is also known to polymerise α-olefins using Ziegler catalysts which have been modified by reaction of the organometallic component with a donor compound such as an amide, carbamate or urea. It has been proposed to polymerise vinyl and vinylidene halides, using the modified Ziegler catalysts, in bulk or in solution phase. However use of these catalysts requires a lengthy induction period.

We have found that these modified Ziegler catalysts may be used for polymerising gaseous vinyl halides and/or gaseous vinylidene halides to produce high yields of polymer and also that the value of these catalysts may be enhanced by ageing the catalysts in a particular way prior to their use for polymerising vinyl and/or vinylidene halides in bulk, in solution or in gaseous phase.

According to the present invention, we provide a process for the polymerisation of vinyl halides and/or vinylidene halides in gaseous phase which comprises contacting the vinyl halide or vinylidene halide in the gaseous form with a catalyst composition comprising (a) at least one compound of a transition metal of Groups IVA to VIA of the Periodic Table of the Elements, hereinafter referred to as the transition metal compound, and (b) at least one compound having the structure

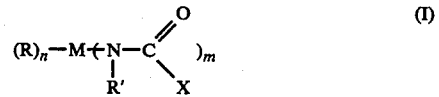

where M is aluminium or zinc, n and m each is an integer not greater than one less than the valency of M, at least one of the groups R is a hydrocarbon group, R' is hydrogen or a hydrocarbon group, and X is hydrogen or a monovalent organic group. Preferably the polymerisation is effected in the presence of a particulate seed material, for example a preformed polymer of a vinyl or vinylidene halide, which acts as a support for the catalyst composition.

We have found that the catalyst composition as defined in the immediately preceding paragraph is particularly useful if component (b) is aged prior to use. Ageing of component (b) of the catalyst composition results in the formation of a chemical complex and the liberation of an organic mono-isocyanate and a particularly useful catalyst is obtained if the ageing is effected under conditions such that the resulting organic mono-isocyanate is removed from the catalyst composition as it is liberated.

According to a preferred embodiment of the invention, therefore, we provide a process for the polymerisation of vinyl halides and/or vinylidene halides which comprises contacting the monomer or monomers with a catalyst composition comprising (a) at least one compound of a transition metal of Groups IVA to VIA of the Periodic Table of the Elements, and (b) the product of ageing at least one compound having the structure I as hereinbefore defined under conditions such that the resulting organic mono-isocyanate is removed from the composition.

The catalyst composition containing the product of ageing catalyst component (b) and free of isocyanate is a novel composition which is provided according to a further feature of the invention.

Ageing of component (b) of the mixture to yield the novel catalyst compositions may be effected simply by allowing the mixture to stand for several days under reduced pressure so that the isocyanate which is liberated is removed as a gas. However, ageing is accelerated at higher temperatures and the preferred method of making the novel catalyst compositions comprises heating the component (b) or the mixture as hereinbefore defined under reduced pressure. The temperature at which the heating is carried out is not critical but will usually be within the range 50° C. to 100° C., especially in the novel range 60° C. to 80° C. Since the activity of the novel catalyst compositions may be reduced if the composition is contacted with oxygen and moisture, they are normally prepared by heating component (b) or the mixture as defined under an inert atmosphere in the substantial absence of oxygen and moisture. The pressure at which the ageing is effected may be any pressure below atmospheric pressure but will usually be considerably less than atmospheric pressure, for example as low as 0.1 mm of mercury or even lower. Conveniently the catalyst may be aged by heating a slurry or solution of the catalyst mixture in a high-boiling solvent under reduced pressure.

The novel catalyst, compositions, when used to polymerise gaseous monomers are preferably used in the presence of and supported by a solid, particulate seed material which preferably is a preformed polymer of a vinyl halide and/or a vinylidene halide. In such cases ageing of component (b) or of the mixture to yield the novel catalyst compositions may be carried out using the component or the mixture dispersed in the seed material so that the resulting supported catalyst is ready for immediate use. A convenient method of preparing a supported catalyst composition comprises adding the mixture of catalyst components to a slurry of the support material in a vinyl halide and then removing the vinyl halide by distillation of the slurry followed by heating the mixture under reduced pressure to remove traces of the vinyl halide and the resulting isocyanate.

The novel catalyst compositions of the present invention are liquids which are stable at ordinary temperatures and pressures and which may be stored under an inert atmosphere for prolonged periods prior to use.

As stated hereinbefore, ageing of component (b) of the catalyst composition yields a chemical complex and an organic mono-isocyanate.

The chemical complex has the formula

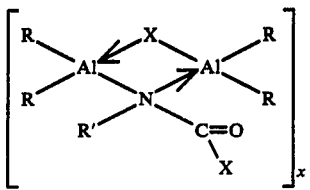

where x is in the range 1 to 2. Molecular weight determinations in freezing cyclohexane using the complex II wherein R is ethyl, R' is propyl and X is —OR (R is ethyl) have shown x to be 1.5.

Infra-red studies of this novel catalyst composition have shown that the composition may contain a further complex in addition to complex II. This additional complex has the structure

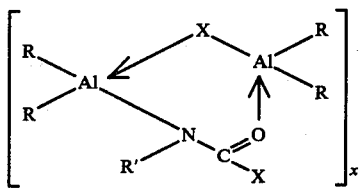

where x is as in complex II. In the case of catalyst compositions wherein X is —OC$_2$H$_5$, infra-red studies in cyclohexane at 20° C. have shown that the catalyst is a mixture of 80% of complex II and 20% of complex III.

The catalyst complex or complexes are described hereinbefore in respect of catalysts compositions as defined wherein X is —OR, but it is to be understood that similar complexes are obtained for different X groups, whether X be hydrogen or a monovalent organic radical. Further, whilst only complexes containing aluminium have been discussed, similar complexes are formed where the aluminium is replaced by zinc, although clearly each zinc atom will have only a single group R attached to it, i.e.

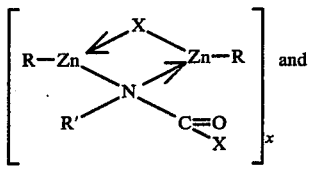 and

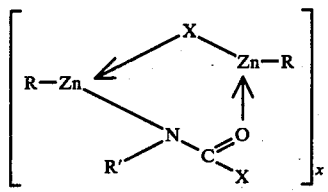

The novel catalyst compositions of this invention may be used to polymerise vinyl halides and/or vinylidene halides in bulk, liquid or gaseous phase. As in the case described hereinbefore using a catalyst composition which has not been aged for polymerising gaseous vinyl or vinylidene halides, the novel catalyst composition preferably is used supported on a seed material.

The Periodic Table of the Elements referred to throughout the specification is the Table printed inside the back cover "Advanced Inorganic Chemistry" by F. A. Cotton and G. Wilkinson, 2nd Edition, Interscience Publishers 1966.

Particularly suitable transition metal compounds are zirconium and those of the first long period of the Periodic Table, especially titanium and vanadium. Particularly preferred transition metal compounds are those of titanium and zirconium. Suitable transition metal compounds include the halide, oxyhalides, alkoxides, alkoxyhalides, alkoxyacetylacetonates, acetoxyhalides and acetylacetonates.

The oxidation state of the transition metal may vary during use of the catalyst composition in the polymerisation reaction, but the transition metal is preferably in a high oxidation state at least initially as for example in vanadium oxytrichloride and titanium tetrachloride.

In the compound having the structure I, M may be aluminium or zinc. Thus, where M is aluminium n may be 1 or 2 and m may be 2 or 1 ($n + m = 3$), and where M is zinc n may be 1 and m may be 1.

At least one of the Groups R in the compound of structure I must be a hydrocarbon group. The hydrocarbon group may be alkyl, aryl, alkaryl or aralkyl and within the term alkyl we include cycloalkyl. Preferred hydrocarbon groups are alkyl groups especially those alkyl groups having from 1 to 10 carbon atoms, e.g. methyl, ethyl, propyl and butyl. In the case where M in the compound of structure I is aluminium and n is 2 both of the groups R may be hydrocarbon or one may be hydrocarbon and the other may be, for example halide, e.g. chloride, oxyhydrocarbon e.g. oxyalkyl, or dihydrocarbon substituted amine, e.g. dialkylamine.

The group R' is hydrogen or a hydrocarbon group and may be a hydrocarbon group of the type hereinbefore described in respect of the group R.

The group X in the compound of structure I is hydrogen or a monovalent organic group. Suitable monovalent organic groups include hydrocarbon groups, for example, alkyl and cycloalkyl groups, e.g. methyl, ethyl, propyl, butyl and cyclohexyl, oxyhydrocarbon groups, for example oxyalkyl groups, e.g. methoxy, ethoxy, propoxy and butoxy, substituted amino groups having the structure —NR'' where the groups R'' which may be the same or different, are hydrocarbons, e.g. alkyl groups, phosphorus analogues of the aforementioned substituted amino groups in which N is replaced by P, hydroxy and thiol.

The compound having the structure I may be prepared by reacting an organo aluminium or an organo zinc compound, for example, an aluminium trihydrocarbyl or a zinc dihydrocarbyl, e.g. an aluminium trialkyl or a zinc dialkyl, with a compound having the structure

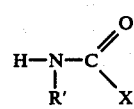 IV the proportion of organo aluminium or organo zinc compound to compound of structure IV which is used being chosen to give a compound of structure I having the desired values of n and m.

Thus, where X in the compound having the structure I is hydrogen the compound of structure IV may be formamide or an N-hydrocarbon substituted formamide and where X is an alkyl group the compound of structure IV may be an alkyl amide or an N-hydrocarbon substituted alkyl amide. Where X in the compound of structure I is a hydroxyl group the compound of structure IV which is used may be an N-hydrocarbon substituted carbamic acid and where X is an oxyhydrocarbon group the compound of structure IV which is used in the preparation may be a derivative of an N-hydrocarbon substituted carbamic acid, for example, an alkyl derivative in which case X is an oxyalkyl group. Where the group X in the compound of structure I is a substituted amino group having the structure —NR'' then the compound of structure IV may, for example, be a substituted urea of structure

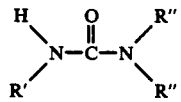

The compound of structure I may be prepared by reaction of an organo aluminium compound or an organo zinc compound of structure $R_2AlX$ or $RZnX$, where at least one of the groups R is a hydrocarbon group, with an organic isocyanate having the structure $R'-N=C=O$. For example, in the compound of structure I where M is aluminium, n is 2 and m is 1, the groups R are ethyl groups and the group R' is butyl, then in order to prepare a compound of structure I in which X is hydrogen, hydroxy, ethyl or ethoxy the isocyanate used should be butyl isocyanate and the organo aluminium compounds used should be, respectively, diethyl aluminium hydride, diethyl aluminium hydroxide, triethyl aluminium and diethyl aluminium ethoxide.

The group X may be a group which includes a unit of the structure

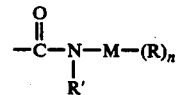

and in this case the compound of structure I may be formed by reaction of an organo aluminium or an organo zinc compound with a polyisocyanate. For example, in order to prepare a compound of structure I in which the group X has the structure

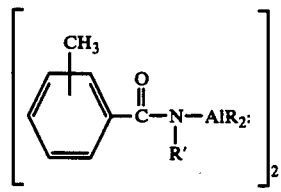

then an aluminium alkyl of structure $R_2R'Al$ may be reacted with toluene diisocyanate in a molar proportion of 1:2.

Preparation of the compound of structure I may suitably be carried out in solution, for example, in a hydrocarbon diluent or in a diluent of vinyl halide and/or vinylidene halide. The reaction should be effected in the substantial absence of oxygen and water and is preferably effected in the presence of an inert gas. The reaction may suitably be effected at a temperature in the range of −30° C. to 80° C.; the reaction may conveniently be effected at room temperature, e.g. about 25° C.

If desired the compound of structure I may be isolated from the diluent, e.g. by evaporation of the diluent. Alternatively, the compound of structure I may be mixed with the transition metal compound in the diluent and the diluent may, if desired, subsequently be evaporated. The preparation of the compound of structure I and the subsequent addition of the transition metal compound may conveniently be carried out in the vessel in which the vinyl halide and/or vinylidene halide is to be polymerised.

In the catalyst composition it is preferred that there should be at least one atom of aluminium or zinc for every atom of transition metal. The upper limit on the atomic proportion of aluminium or zinc, or total of aluminium and zinc where both aluminium and zinc are used, to transition metal will depend on the polymerisation conditions and simple experiment will readily show when further increase in the ratio ceases to have any appreciable effect. Conveniently, the atomic ratio of aluminium or zinc, or of aluminium plus zinc, to transition metal may be from 1:1 to 10:1, although ratios outside this range may be used. A suitable value is 3:1.

In the process of the invention, the vinyl halide may be, for example, vinyl chloride or vinyl bromide, and the vinylidene halide may be, for example, vinylidene chloride or vinylidene bromide. If desired one or more vinyl halides and/or one or more vinylidene halides may be copolymerised. Furthermore, one or more vinyl halides and/or one or more vinylidene halides may be copolymerised with one or more other ethylenically unsaturated monomers copolymerisable therewith and where we refer to polymerisation of vinyl halide and/or vinylidene halide it is to be understood that we include the case where vinyl halide and/or vinylidene halide is copolymerised with one or more other ethylenically unsaturated monomers. The copolymerisable ethylenically unsaturated monomer may be, for example, vinyl acetate, styrene, methyl acrylate, methyl methacrylate, acrylonitrile, ethylene, propylene, butene, 4-methyl pentene-1 and butadiene. It is preferred that the vinyl halide and/or vinylidene halide be used in the process in a proportion so as to yield a copolymer containing at least 70% by weight of units derived from the vinyl halide and/or vinylidene halide. For simplicity we will refer to the vinyl halide and vinylidene halide or mixture thereof, optionally with other copolymerisable ethylenically unsaturated monomer, as the monomer or monomers.

The catalyst compositions may be employed in liquid solution. For example, the monomer or monomers to be polymerised may act as a solvent for the catalyst composition although it may be necessary to add a small amount of an inert diluent to ensure that the catalyst composition is soluble. Alternatively, the monomer or monomers to be polymerised may be present in solution in an inert liquid diluent in which the catalyst composition is soluble. Examples of suitable inert liquid diluents are tetrahydrofuran and aliphatic and aromatic diluents, for example, pentane, hexane, heptane, octane, benzene and toluene.

The catalyst concentration employed is not critical and will depend on the reaction conditions and the activity of the chosen catalyst composition. A convenient concentration is about 3 moles of monomer per mmole of transition metal compound, that is, a molar concentration of transition metal compound of 0.033%. Depending on the activity of the catalyst, higher or lower concentrations may be employed, and lower concentrations may be desirable in order to reduce the proportion of catalyst residues in the product polymer. A convenient concentration range is from 1 to 40 moles of monomer for every mmoles of transition metal compound, that is a catalyst concentration of from 0.0025 to 0.1 mole % of transition metal compound.

When using a non-aged catalyst composition, the composition may be formed *in situ*. The catalyst components may be used in any order, but it is preferred that the second component is contacted with the monomer or monomers to be polymerised not later than the transition metal component is contacted with the monomer(s).

Since the catalyst compositions generally are air-and water-sensitive it is desirable that the catalyst is prepared, stored (if desired), and used in dry, oxygen-free conditions. This may conveniently be achieved by using dry monomers, and in particular dry vinyl halide and/or vinylidene halide, and by working under a blanket of dry, inert gas, for example oxygen-free nitrogen.

The activity of the catalyst composition may be at a maximum if it is prepared immediately before use, either in a separate reaction vessel or in the polymerisation vessel, and such fresh prepration is therefore preferred.

It is preferred that the monomer to be polymerised be free of impurities, for example, oxygen and water, which will react with the catalyst and have an adverse effect on catalyst activity. It is therefore desirable that the monomer is purified and dried before use. This may be achieved in conventional manner, for example, by distillation or by contacting the monomer with a material which will remove water and impurities, e.g. a molecular sieve or alumina. When the latter procedure is employed, the monomer may be liquid or gaseous, but purification may be more efficient if the monomer is gaseous.

Since traces of acetylenes may have an adverse effect on the activity of the catalyst composition, it is preferred to use vinyl halide or vinylidene halide, e.g. vinyl chloride or vinylidene chloride, which has been derived from ethylene rather than from acetylene.

The preferred processes of the present invention, using either an aged or a non-aged catalyst composition, comprise effecting contact between gaseous monomer or monomers, e.g. gaseous vinyl halide and/or vinylidene halide, and the catalyst composition. This process may conveniently be, and preferably is, effected using a fluidised bed technique. Thus, the catalyst composition may be fluidised in a suitable reactor and contact may be effected between the catalyst composition and the gaseous monomer or monomers to be polymerised in the process. Fluidisation may be effected mechanically, e.g. by suitable mechanical agitation, but is preferably effected by means of the gaseous monomer introduced into the polymerisation vessel. The pressure of the monomer or monomers in the polymerisation vessel should be below the critical pressure at the particular temperature used. Preferably, polymerisation is effected at the autogenous pressure of the monomer or monomers to be polymerised or at a pressure below the autogenous pressure.

We have found that reduction of the pressure at which the polymerisation reaction is effected results in an improvement in the particle structure and morphology of the product polymer. In particular we have found that effecting the polymerisation at a pressure well below the saturated vapour pressure of the vinyl halide(s) or vinylidene halide(s) results in an improved product polymer. However, reduction of the operating pressure results in decrease of activity of the catalyst and so it is necessary in practice to reach a compromise between desirable product properties and adequate rate of polymerisation. For example, we have found that using identical reaction conditions except for the pressure of the polymerisation vessel, operation at 7.7 bar (1 bar = 14.52 psi) produced slightly more than two thirds of the polyvinyl chloride produced by operation at 9.2 bar. The operating pressure may be in the range 2.0 to 9.2 bar, the preferred pressure being in the range 5.0 to 9.0 bar.

The polymerisation process, whether using a non-aged or an aged catalyst and whether in the latter case it is effected in liquid monomer or monomers, in solution, or by effecting contact between the catalyst composition and gaseous monomer or monomers, may suitably be effected at a temperature in the range 40° C. to 75° C. Although higher or lower temperatures may be used, for example, a temperature up to 100° C. or greater or a temperature even as low as −80° C., the temperature should not be so low that the molecular weight of the resultant polymer is so high that the polymer is difficult to process, nor should the temperature be so high that the molecular weight of the resultant polymer is so low that the polymer has unsatisfactory properties.

In the process of the present invention at least the first component of the catalyst composition whether using an aged catalyst or not, that is, the compound of a transition metal of Groups IVA to VIA of the Periodic Table of the Elements, may be carried on a particulate support which should be free of adsorbed water. It is especially convenient to use such a supported catalyst in the process in which polymerisation is carried out by effecting contact between gaseous monomer or monomers and the catalyst composition. Both components of the catalyst composition may be carried on a particulate support. Suitable particulate supports include, for example, a substantially inert, solid matrix material having a hydroxylic surface which is substantially free from adsorbed water. Such matrix materials are described in our British Pat. application Nos. 55244/70, 36628/71, published as Offenlegungsschrift 2,157,498. Examples of suitable matrix materials are silica or alumina or mixtures thereof. The catalyst components may be bonded to the matrix material by reacting the components, preferably in solution, e.g. in solution in an inert diluent or in the monomer or monomers to be polymerised, with the matrix suspended in the solution. Thereafter, the matrix material carrying the catalyst components may if desired be isolated in particulate form, for example by removing the diluent, e.g. by evaporation, or by filtration. The reaction with the matrix material may suitably be carried out in the vessel in which the polymerisation is to be effected; ageing of the catalyst may also be carried out in this vessel prior to introduction of the monomer(s) to be polymerised.

In a preferred embodiment the particulate support is a polymer formed by polymerisation of a vinyl halide and/or a vinylidene halide, for example a polymer formed by polymerisation of the vinyl halide and/or vinylidene halide which is to be polymerised in the process of the invention. The polymer support should be substantially free of adsorbed water and for this reason it is preferred, where the polymer is a polymer of a vinyl halide and/or vinylidene halide, to use a polymer which has been prepared by polymerisation of bulk vinyl halide and/or vinylidene halide rather than a polymer which has been prepared in an aqueous dispersion polymerisation process, since in the latter case considerable difficulty may be encountered in ensuring that the polymer support is substantially free of adsorbed water.

A convenient size of particulate material with which to support the catalyst composition is a size in the range 1 to 1000 microns, preferably in the range 30 to 200 microns.

Where a fluidised bed technique is used in the polymerisation process, the particulate support should preferably be capable of being fluidised by the monomer or monomers to be polymerised and the rate of introduction of the monomer or monomers into the polymerisation vessel and the nature of, and in particular the particle size of, the particulate support must be chosen to achieve this objective. In order to aid fluidisation it is preferred to use a particulate support material comprising particles of differing sizes.

It is to be understood that although the monomer or monomers may, in the case where the catalyst composition is carried by a particulate support material, form a condensed phase in or on the particulate support material, especially where the particulate support material is porous, a process involving the formation of such a condensed phase and polymerisation thereof is still considered to be a process in which contact is effected between gaseous monomer or monomers and the catalyst composition.

In the process of the present invention where at least one of the components of the catalyst composition is carried by a particulate support, the polymer formed by polymerisation of the monomer or monomers grows on the surface of the particulate support which thus is a seed material. Therefore, since the particulate support forms a part of the polymer produced in the process of the invention, it is preferred that the particulate support comprises a preformed polymer formed by polymerisation of the same monomer or monomers as is to be polymerised.

The invention is now illustrated by the following Examples.

EXAMPLE 1

The polymerisation apparatus comprised a 7.2 liter capacity stainless steel autoclave equipped with a stirrer, bursting discs, entry ports for charging polymerisable monomers and catalyst, an evacuation port, and an electrically heated oil-filled heating jacket. A 5 liter capacity stainless steel reservoir was connected to the autoclave via a ¼ inch internal diameter stainless steel transfer line. The reservoir and transfer line were surrounded by a copper tube heating coil through which water could be passed and the reservoir could be isolated from the autoclave by a valve in the transfer line.

Prior to effecting polymerisation the autoclave was heated at a temperature of 120° C. for 2 hours under vacuum. 4 liters of liquid vinyl chloride which had beed dried by passing through 4A molecular sieve was charged to the reservior, the reservior being isolated from the autoclave, the reservoir was sealed, and the reservoir and transfer line were heated to a temperature of 58° C. 200 g. of a powdered poly(vinyl chloride) having a particle size in the range 50 and 200μ and which had been produced by polymerisation of liquid vinyl chloride was charged to the autoclave. The poly(vinyl chloride) powder was then stirred and 10 ml of a 1 molar solution of $TiCl_4$ in hexane and 30 ml of a 1 molar solution of an organo aluminium compound in toluene were charged to the autoclave. The organo aluminium compound had the structure I in which R is ethyl, n = 2, m = 1, R' is $CH_3$ and X is $-OC_2H_5$ and was fromed by reacting equivalent amounts of aluminium triethyl and ethyl N-methyl carbamate in toluene. The toluene and hexane were removed by applying a vacuum to the autoclave which was then heated to a temperature of 60°.

Stirring was continued and after the toluene and hexane had been removed the valve was opened in order to connect the reservoir with the autoclave and thus transfer gaseous vinyl chloride to the autoclave. Polymerisation of the vinyl chloride commenced and after 18 hours the valve was closed, the autoclave was vented to atmosphere, and 3500 g. of powdered poly(vinyl chloride) was removed from the autoclave. The amount of vinyl chloride polymerised was thus 3300 g. The growth factor, that is, the total amount of polymer per unit weight of particulate support, was 17.5.

EXAMPLE 2

The procedure of Example 1 was followed except that 100 g. of poly(vinyl chloride) support and 50 ml. of a 1 molar solution in toluene of an organo aluminium of structure I in which R is ethyl, n = 2, m = 1, R' is methyl and X is H prepared by reacting in toluene solution equimolar amounts of aluminium triethyl and N-methyl formamide were used, and the temperature of the autoclave was 65° C. that of the reservoir and transfer line was 63° C., and polymerisation was effected for 17 hours.

The yield of powdered poly(vinyl chloride) was 2750 g. The amount of vinyl chloride polymerised was thus 2650 g. and the growth factor was 27.5.

EXAMPLE 3

The procedure of Example 1 was followed except that 5 ml. of a 1 molar solution of $TiCl_4$ in hexane and 15 ml of a 1 molar solution in toluene of an organo aluminium compound as used in Example 2 were used, the temperature of the autoclave was 65° C. and that of the reservoir and transfer line was 63° C., and polymerisation was effected for 3.75 hours.

The yield of powdered poly(vinyl chloride) was 2530 g. The amount of vinyl chloride polymerised was thus 2330 g. and the growth factor was 12.65.

EXAMPLE 4

The procedure of Example 1 was followed except that 5 ml. of a 1 molar solution of $TiCl_4$ in hexane and 15 ml. of a 1 molar solution in toluene of an organo aluminium compound of structure I in which R is ethyl, n = 2, m = 1, R' is n-butyl and X is $-O-N=C(CH_3)_2$ prepared by reacting in toluene solution equimolar amounts of aluminium triethyl and a reaction product of n-butyl isocyanate and acetoxime were used, and polymerisation was effected for 4.5 hours. The yield of powdered poly(vinyl chloride) was 1450 g. The amount of vinyl chloride polymerised was thus 1250 g. and the growth factor was 7.25.

EXAMPLE 5

200 g. of polyvinyl chloride having a particle size of 50–200 microns and produced by polymerisation of liquid vinyl chloride, was dried in a 2 liter vessel at 20° C. and 0.1 mm mercury pressure for 16 hours, after which time the vessel and its contents were cooled to −78° C. 500 ml of liquid vinyl chloride was distilled into the vessel to produce a slurry of polyvinyl chloride particles in vinyl chloride monomer. This slurry was heated under reflux conditions and 15 mmoles of ethyl N-propyl carbamatodiethyl aluminium was added with shaking, followed by 5 mmole of titanium tetrachloride. The mixture was shaken for 10 minutes and the vinyl chloride and any liberated isocyanate were distilled off, final traces being removed by heating the mixture under vacuum.

The resulting free-flowing powder was charged under an atmosphere of nitrogen gas, to the autoclave of the apparatus described in Example 1. The valve was opened to connect the autoclave with the reservoir and vinyl chloride was polymerised as in Example 1.

The polymerisation reaction was stopped after 5 hours and 2,400 g. of polyvinyl chloride were recovered from the autoclave. The amount of vinyl chloride polymerised thus was 2,200 g. and the growth factor was 11.

EXAMPLE 6

The procedure of Example 1 was repated except that the reservoir temperature was 50° C. instead of 58° C.; the vapour pressure of the vinyl chloride thus was 7.7 bar instead of 9.2 bar.

2,700 g. of polyvinyl chloride was recovered from the autoclave, i.e. 2,500 g. of vinyl chloride had been polymerised.

EXAMPLE 7

30 mmoles of ethyl N-propyl carbamatodiethyl aluminium was heated at 60° C. for 5 hours under a pressure of 0.1 mm of mercury. The $C_3H_7NCO$ liberated was thus removed from the vessel, to yield a liquid catalyst composition containing a complex of structure II and a complex of structure III. Molecular weight determinations in freezing cyclohexane indicated that in the complexes x = 1.5, and infra-red studies of the complexes in hexane at 20° C. indicated that the mixture contained 80% of complex II and 20% of complex III.

The procedure described in Example 1 was followed to polymerise vinyl chloride except that the liquid catalyst composition prepared above was used instead of the solution of the organoaluminium compound used in Example 1, and the reservoir temperature was 50° C. instead of 58° C.

Polymerisation was stopped after 4.5 hours and 2,200 g. of polymer were removed from the autoclave. The yield of polyvinyl chloride obtained by the process thus was 2,000 g.

EXAMPLE 8

Vinyl chloride was polymerised by the procedure described in Example 1 except that 10 ml of a 1M solution of $VOCl_3$ i hexane were used instead of the solution of $TiCl_4$.

The polymerisation was stopped after 5 hours and 470 g. of polymer were recovered from the autoclave; i.e. 450 g. of vinyl chloride had been polymerised.

EXAMPLE 9

Vinyl chloride was polymerised as in Example 1 except that ethyl N-propyl carbamatodibutyl aluminium was employed as the organoaluminium compound.

Polymerisation was stopped after 16 hours and 3800 g. of polymer were recovered from the autoclave, i.e. 3,600 g. of vinyl chloride had been polymerised.

EXAMPLE 10

Vinyl chloride was polymerised by the procedure described in Example 7 except that ethyl N-propyl carbamato dimethyl aluminium was employed as the organoaluminium compound.

Polymerisation was stopped after 10 hours and 1700 g. of polymer were recovered from the autoclave, i.e. 1500 g. of vinyl chloride had been polymerised.

EXAMPLE 11

Vinyl chloride was polymerised by the procedure of Example 1 except that ethyl N-butyl carbamato ethyl zinc was employed instead of the organoaluminium compound.

After 16 hours the polymerisation was stopped and 520 g. of polymer were recovered from the autoclave, i.e. 500 g. of vinyl chloride had been polymerised.

EXAMPLE 12

The procedure of Example 1 was employed to polymerise vinyl chloride but using butyl N-propylcarbamato diethyl aluminium as the organoaluminium compound.

After 15 hours the yield of polyvinyl chloride was 2,800 g. i.e. 3,000 g. were recovered from the autoclave.

EXAMPLE 13

The procedure of Example 1 was used to polymerise vinyl chloride except that sec-butyl N-propylthiocarbamato diethyl aluminium was employed as the organoaluminium compound.

The yield of polyvinyl chloride after 16 hours was 600 g, i.e. 800 g. were recovered from the autoclave.

EXAMPLE 14

This example demonstrates the need to remove the isocyanate from the catalyst composition as it is liberated during ageing of the organometallic component of the composition.

A 1 liter autoclave equipped with a stirrer, entry port for catalysts and monomer, evacuation port, bursting disc, heating jacket and a nitrogen inlet was purged with nitrogen gas.

The autoclave was charged with 100 ml of hexane followed by 2.21 ml of the neat liquid obtained as follows. To a 100 ml flask purged with nitrogen gas was added 15 ml of hexane and 2.49 g of $Et_3Al$. 2.89 ml of ethyl-N-propylcarbamate was added dropwise at 5° C. during 10 min, and the solution was heated at 60° C. for 5 hours under a pressure of 0.1 mm Hg, to yield a solvent-free and isocyanate-free neat liquid catalyst composition. 0.22 ml of $TiCl_4$ was then added to the autoclave followed by 500 ml of liquid vinyl chloride. The polymerisation was carried out at 60° C. for 4.25 hours to yield 48.2 g of white granular polyvinyl chloride.

For comparison purposes, a catalyst composition containing the organo metallic component (b) aged without removal of isocyanate was employed.

The autoclave was charged with 100 ml of hexane followed by 5.7 ml of a solution prepared as follows.

To a 100 ml flask purged with nitrogen was added 15 ml of hexane and 2.49 g of $Et_3Al$ 2.89 ml of Ethyl-N-propylcarbamate was added dropwise at 5° C. during 10 min. and the solution was heated at 60° under reflux for 5 hours to give the catalyst solution. 0.22 ml of $TiCl_4$ was added to the autoclave followed by 500 ml of liquid vinyl chloride.

The polymerisation was carried out at 60° C. for 5 hours to yield 45.5 gm of white granular PVC.

EXAMPLE 15

The procedure described in Example 1 was employed to polymerise vinyl chloride except that instead of adding catalyst components to the polyvinyl chloride in the autoclave, the catalyst was prepared in a separate vessel as follows:

200 g of a powdered polyvinyl chloride having a particle size in the range 50 to 200 microns and produced by polymerisation of liquid vinyl chloride, was charged to a 2-liter flask. The powder was dried by heating it at 20° C. for 8 hours under a pressure of 0.1 mn Hg. at −78° C., 500 ml of vinyl chloride was distilled onto the dry powder to produce a slurry and 2.04 ml of triethyl aluminium was added at −13° C., followed by 0.89 g of N-methyl formamide which was added dropwise over a period of 10 minutes. 0.55 ml of $TiCL_4$ was then added dropwise with vigorous agitation of the slurry and then the vinyl chloride was removed by distillation to yield a free-flowing powder. This powder was poured into the autoclave and polymerisation was effected as described in Example 1 using an autoclave temperature of 60° C. (pressure 8.8 bar) for 3.75 hours, after which time the polymerisation was stopped and 2850 g of polyvinyl chloride were recovered from the autoclave; yield 2650 g.

EXAMPLE 16

The procedure of Example 15 was repeated using 1.72 g of N-butyl acetamide instead of N-methyl formamide.

The polymerisation was carried out at 60° C. for 5 hours and the yield of polyvinyl chloride was 1824 g.

EXAMPLE 17

The procedure of Example 15 was repeated using 1.28 g of 2-pyrrolidone instead of N-methyl formamide.

The polymerisation was carried out at 60° C. for 4 hours to yield 2250 g of polyvinyl chloride.

EXAMPLE 18

The procedure of Example 15 was employed using 3.18 g of carbanilide ($C_6H_5NH\ CO\ NH\ C_6H_5$) instead of N-methyl formamide.

Polymerisation at 60° C. for 6 hours yielded 1300 g of polyvinyl chloride.

EXAMPLES 19 and 20

Vinyl chloride was polymerised by the procedure described in Example 7 except that the pressure in the autoclave was 8.8 bar and 6.0 bar respectively instead of 7.7 bar.

The resulting polymers were recovered and 500 g of each was mixed 13.5 g of a mixture of tribasic lead sulphate (1.5 parts), lead stearate (0.7 parts) and calcium stearate. The gel time of 35 g samples of each polymer composition was then determined using a Brabender Plastograph with a chamber temperature of 170° C. and a rotor speed of 50 r.p.m.

The gel times were 18 minutes for the polyvinyl chloride produced at 8.8 bar pressure and 1.1 minutes for the polyvinyl chloride produced at 6.0 bar.

What we claim is:

1. A process for the polymerisation of a monomer selected from the group consisting of vinyl halides and vinylidene halides which comprises contacting the monomer in gaseous form with a catalyst composition consisting essentially of a mixture of, as first component, a compound of a transition metal selected from Groups IVA to VIA of the Periodic Table of the Elements and, as second component, the product obtained by ageing a compound having the structure

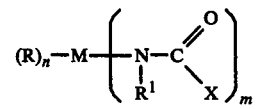

wherein M is aluminium or zinc, at least one of the groups R is a hydrocarbon group, n and m each is an integer not greater than one less than the valency of M, $R^1$ is hydrogen or a hydrocarbon group, and X is hydrogen or a monovalent organic group, and removing the resulting organic monoisocyanate as it is liberated, said catalyst composition having an atomic ratio of aluminium or zinc to transition metal in the range of 1:1 to 10:1 and a concentration in the monomer in the range of about 0.0025 to about 0.1 mole percent of transition metal.

2. The process of claim 1 in which the monomer is contacted with the catalyst composition in the presence of a solid, particulate seed material.

3. The process of claim 2 in which the seed material is a polymer of a monomer selected from the group consisting of vinyl halide and vinylidene halides.

4. The process of claim 2 in which the seed material is a substantially inert, solid matrix material having a hydrosylic surface which is substantially free from adsorbed water.

5. The process of claim 1 in which the transition metal, is in a high oxidation state.

6. The process of claim 1 in which the second catalyst component is the product of reacting an aluminium trihydrocarbyl or a zinc dihydrocarbyl at a temperature in the range of −30° C. to 80° C. with a compound having the structure

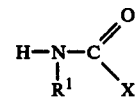

wherein $R^1$ and X are as defined in claim 1.

7. The process of claim 1 in which the second catalyst component is the product of reacting a compound of structure $R_2$ Al X or RZnX at a temperature in the range of −30° C. to 80° C. with an organic isocyanate.

8. The process of claim 1 in which the polymerisation is effected at a temperature in the range of 40° C. to 75° C.

9. The process of claim 2 which is effected using a fluidised bed technique.

10. The process of claim 2 in which the seed material has a particle size in the range of 1 to 1000 microns.

11. The process of claim 1 in which the polymerisation is effected at the autogenous pressure of the monomer to be polymerised.

12. The process of claim 1 in which the monomer is vinyl chloride which has been derived from ethylene.

13. The process of claim 3 in which the seed material is prepared by polymerisation of bulk monomer.

14. The process of claim 1 which is effected in the substantial absence of oxygen and water.

15. A process according to claim 1 for the polymerisation of a monomer selected from the group consisting of vinyl halides and vinylidene halides which comprises contacting the monomer at a temperature of from −80° C. to 100° C. with said catalyst composition.

16. The process of claim 15 in which the second catalyst component is heated at a temperature in the range of 50° C. to 100° C. under substantially vacuum conditions to age the component and remove the organic mono-isocyanate.

17. The process of claim 16 in which the monomer is in the gaseous form and is contacted with the catalyst composition in the presence of a solid, particulate seed material.

18. The process of claim 17 in which the seed material is a polymer of a monomer selected from the group consisting of vinyl halides and vinylidene halides.

19. The process of claim 17 in which the seed material is a substantially inert, solid matrix material having a hydroxylic surface which is substantially free from adsorbed water.

20. The process of claim 17 in which ageing of the mixture of catalyst components is effected in the presence of the seed material.

21. The process of claim 17 in which prior to introduction of the monomer to be polymerised the catalyst composition or the mixture of catalyst components is dispersed in a slurry of the seed material in a liquid diluent and the liquid diluent is subsequently removed.

22. The process of claim 15 in which the transition metal is, at least initially, in a high oxidation state.

23. The process of claim 15 in which the polymerisation is effected at a temperature in the range of 40° C. to 75° C.

24. The process of claim 23 in which the monomer is gaseous and the polymerisation is effected using a fluidised bed technique.

25. The process of claim 15 in which the monomer is vinyl chloride derived from ethylene.

* * * * *